J. E. YERNAUX.
SCREENING APPARATUS.
APPLICATION FILED JULY 20, 1918.

1,312,664.

Patented Aug. 12, 1919.
2 SHEETS—SHEET 1.

Inventor:
Joseph Eugène Yernaux
By Attorneys,
Fraser, Turk & Myers

J. E. YERNAUX.
SCREENING APPARATUS.
APPLICATION FILED JULY 20, 1918.

1,312,664.

Patented Aug. 12, 1919.
2 SHEETS—SHEET 2.

Inventor:
Joseph Eugène Yernaux
By Attorneys,

UNITED STATES PATENT OFFICE.

JOSEPH EUGÈNE YERNAUX, OF PUTEAUX, FRANCE.

SCREENING APPARATUS.

1,312,664.  Specification of Letters Patent.  Patented Aug. 12, 1919.

Application filed July 20, 1918. Serial No. 245,914.

*To all whom it may concern:*

Be it known that I, JOSEPH EUGÈNE YERNAUX, a subject of the King of Belgium, residing in Puteaux, France, have invented certain new and useful Improvements in Screening Apparatus, of which the following is a specification.

This invention relates to a screening apparatus for classifying materials in several sizes and separating dust from them, comprising a movable frame or trough carrying several superimposed screens, which is moved and guided in such a manner that it suffers longitudinal and transverse displacement with angular variations suitable for thoroughly distributing and rapidly screening the whole of the material charged into the apparatus.

This result is obtained by means of a guide of suitable profile supporting one of the ends of the trough on each side, while the other end, elastically suspended from a fixed frame, receives movement from a mechanism or otherwise.

The accompanying drawings illustrate the invention.

The trough $a$ contains the screens $b$, the number of which may be varied. There is a separate discharge chute $c$ for each screen.

A hopper $d$ is placed, if necessary, below the trough.

Figure 1:
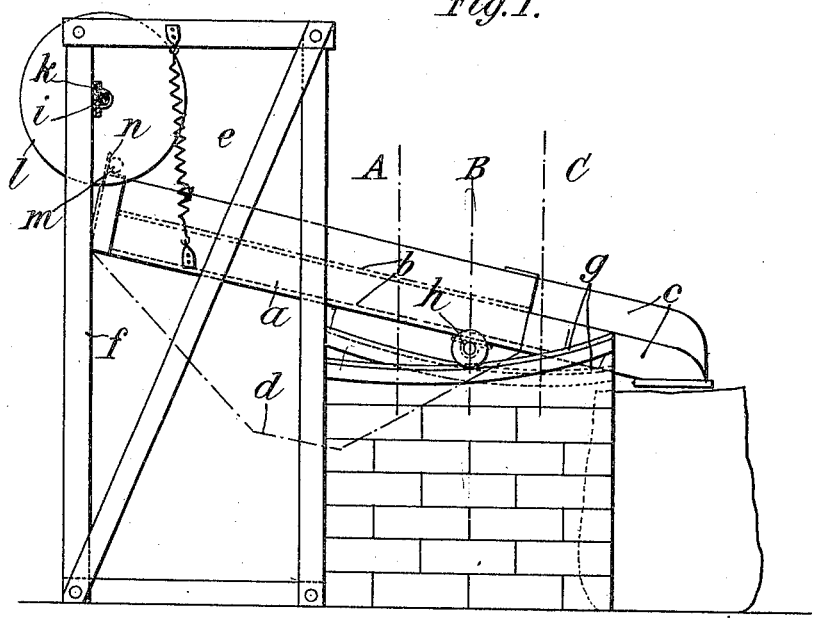
Figure 1 is an elevation of the whole apparatus.
Figure 2:
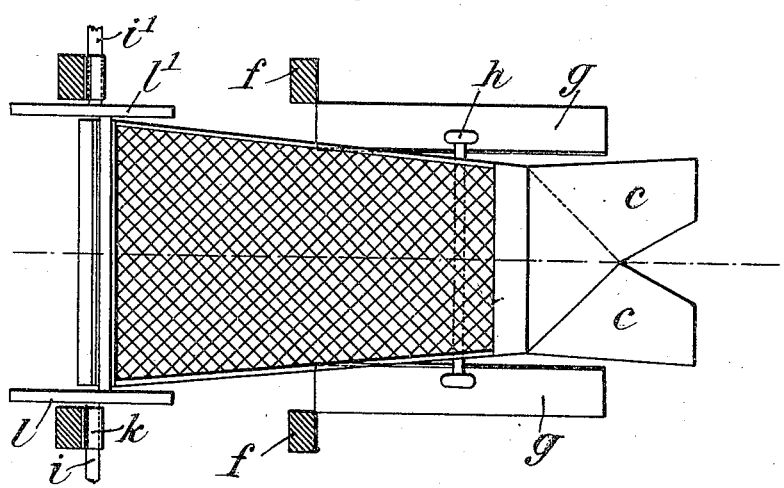
Fig. 2 is a plan in section through the upper part of the frame.

The trough is carried on the one hand by a spring suspension $e$ attached to a rigid frame $f$ and on the other hand by paths $g$ by means of rollers $h$; these paths are for the purpose of imparting an oscillation in a plane at right angles to that of the figure, this oscillation constituting the characteristic feature of the invention. In order that the power necessary for producing the oscillation may be a minimum, the rollers $h$ have their common axis passing through the center of gravity. As shown in Figs. 1 and 2 the several movements are imparted to the trough by rotation of a shaft $i$ mounted in a bearing $k$ fixed to the frame. On this shaft is mounted a disk $l$ having an elongated crank pin $m$ which acts upon the upper part of the trough against an iron reinforcement $n$. At its other end the crank pin is preferably connected with a second disk $l'$ keyed on a shaft $i'$ whose axis is an extension of that of shaft $i$ and which is identically driven.

Figure 6:
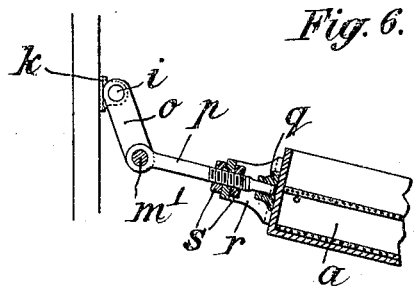
Fig. 6 shows a modification.

In the modification shown in Fig. 6, which is a section through the middle longitudinal line of the end of the trough, the driving shaft $i$ has at its middle part a crank $o$, the crank pin $m'$ of which is connected with a rigid rod $p$ fixed to the end of the trough.

For this purpose the rod is carried by a step bearing $q$ and a spring $r$, with which latter it is connected by the nut $s$ or in any other suitable manner.

This arrangement leaves the end of the trough quite free to oscillate under the action of the rollers $h$ and the movement may be rendered smoother by ball bearings.

In any case the movements impressed upon the trough by the crank pin $m$ or $m'$ are of several kinds.

In the first place there is a longitudinal displacement of the trough, under the action of the crank pin, during the lower half of the path of the latter, and under the action of the weight of the trough, which tends always to apply the projecting end of the reinforcement $n$ against the crank pin, during the other half of its course.

There is also an alternating vertical displacement of the left hand end of the trough due to the suspension springs $e$ which urge the trough upward.

Figure 4:
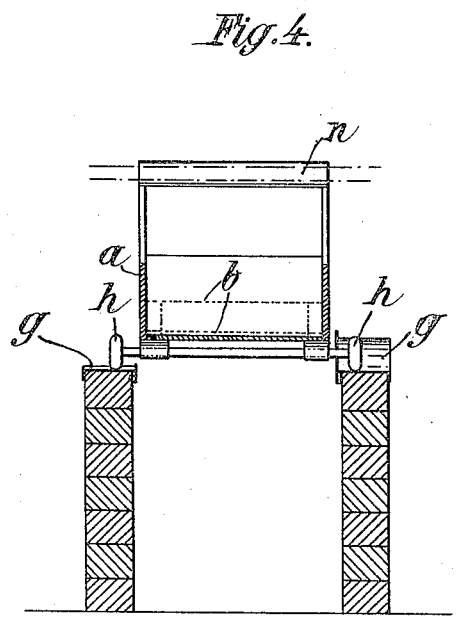
Figs. 3, 4 and 5 are cross sections respectively in planes A B C of Fig. 1 showing the guide paths.
Figure 3:
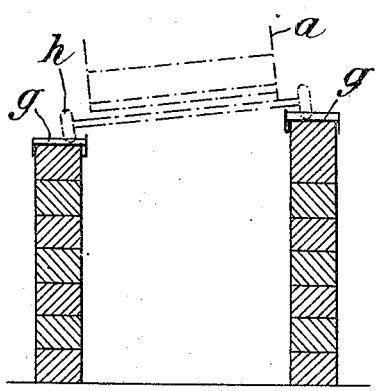
Figure 5:
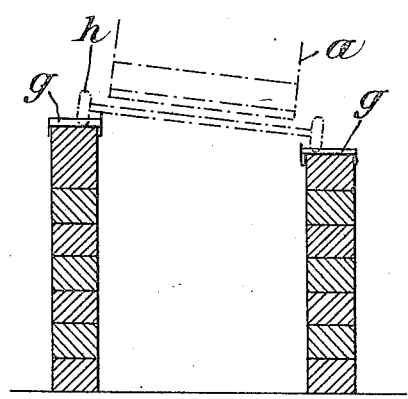

These two movements combine with the new movement produced by the two paths $g$ which are of different profiles in projection, and therefore impart to the trough oscillations including the positions represented in Figs. 3—5, Fig. 4 showing the intermediate position in which the trough is substantially horizontal.

These oscillations are produced during the longitudinal displacement of the trough by means of the crank pin $m$ or $m'$; however, the displacement could be produced in any other suitable manner.

The invention is not limited to the arrangements described above and the apparatus could be completed as required by any suitable device, such as a bagging device or a weighing machine.

So also modifications may be made in the relative proportions of the parts and in their various movements relatively to each other, which may be determined according to the nature of the work to be done.

Having thus fully described the nature of my invention and the best means I know of carrying the same into practical effect, I claim:—

1. A screening apparatus comprising a movable trough, a screen within the said trough, springs suspending the said trough, paths below the said trough on which the trough is adapted to move longitudinally, the said paths being adapted by their varying levels to impart transverse oscillation to the trough as it is moved to and fro along the paths.

2. A screening apparatus comprising a movable trough, screens of different mesh within the said trough, springs suspending the said trough, rollers carried by the said trough, two paths on which the said rollers run, the said paths being adapted by their varying levels to impart transverse oscillation to the trough as it is moved to and fro along the paths.

In witness whereof, I have hereunto signed my name in the presence of two subscribing witnesses.

JOSEPH EUGÈNE YERNAUX.

Witnesses:
 JOHN F. SIMONS,
 HENRI CARTIER.